(12) United States Patent
Nielsen

(10) Patent No.: US 8,785,036 B2  
(45) Date of Patent: Jul. 22, 2014

(54) ELECTROCHEMICAL DEVICE AND METHOD FOR ASSEMBLING AN ELECTROCHEMICAL DEVICE

(71) Applicant: Medtronic, Inc., Minneapolis, MN (US)

(72) Inventor: Christian S. Nielsen, River Falls, WI (US)

(73) Assignee: Medtronic, Inc., Minneapolis, MN (US)

( * ) Notice: Subject to any disclaimer, the term of this patent is extended or adjusted under 35 U.S.C. 154(b) by 76 days.

(21) Appl. No.: 13/665,346

(22) Filed: Oct. 31, 2012

(65) Prior Publication Data

US 2014/0120413 A1    May 1, 2014

(51) Int. Cl.  
*H01M 2/02*    (2006.01)

(52) U.S. Cl.  
USPC .......................................................... 429/179

(58) Field of Classification Search  
None  
See application file for complete search history.

(56) References Cited

U.S. PATENT DOCUMENTS

| | | | |
|---|---|---|---|
| 3,891,462 A * | 6/1975 | Langkau | 429/157 |
| 4,262,414 A | 4/1981 | Sugalski | |
| 6,984,468 B2 | 1/2006 | Rubino et al. | |
| 7,022,146 B2 | 4/2006 | Rubino et al. | |
| 2004/0166406 A1 | 8/2004 | Higuchi et al. | |
| 2009/0233159 A1 * | 9/2009 | Phillips et al. | 429/82 |

FOREIGN PATENT DOCUMENTS

| | | |
|---|---|---|
| JP | 6222366 | 1/1987 |
| JP | 02112149 | 4/1990 |
| JP | 0869785 | 3/1996 |

OTHER PUBLICATIONS (PCT/US2013/067641) PCT Notification of Transmittal of the International Search Report and the Written Opinion of the International Searching Authority, Mailed Jan. 22, 2013, 9 pages.

* cited by examiner

*Primary Examiner* — Patrick Ryan  
*Assistant Examiner* — Christopher Domone

(57) ABSTRACT

Electrochemical device and method for assembling an electrochemical device. The electrochemical device has an electrochemical module and an enclosure configured to enclose the electrochemical module. The enclosure has a first housing portion forming a first rim and being an insulative material and a second housing portion forming a second rim and being the insulative material, the first housing portion and the second housing portion at least partially forming, when the first rim substantially abuts the second rim, a volume configured to enclose the electrochemical device. The enclosure further has a crimp ring engaging the first rim and the second rim, the crimp ring securing the first housing portion with respect to the second housing portion and a grommet positioned between and contacting the first rim and the second rim. The enclosure is substantially sealed.

28 Claims, 10 Drawing Sheets

ELECTROCHEMICAL DEVICE AND METHOD FOR ASSEMBLING AN ELECTROCHEMICAL DEVICE

FIELD

The present invention relates generally to electrochemical devices and, in particular, to electrochemical devices having multi-part housings having closures and methods for assembling such electrochemical devices.

BACKGROUND

Electrochemical modules such as batteries, capacitors and the like are well known in the art. Conventionally, such electrochemical modules are housed in an enclosure. Such enclosures commonly function to substantially isolate the electrochemical module from a surrounding environment, both to maintain the integrity of the electrochemical module and to prevent the materials of the electrochemical module from interacting with environmental materials.

One type of electrochemical module contained within an enclosure is so-called button cell batteries. Button cell batteries conventionally incorporate metallic housing segments which contact the battery contained within. As a result of the contact, each housing segment functions as an electrical contact for the battery, with one housing segment functioning as an anode contact and the other housing segment a cathode contact. A user of the button cell battery may insert the battery into a circuit such that positive and negative terminals of the circuit contact the appropriate housing segment. Consequently, utilizing a metal housing provides both protection against environmental conditions and convenient electrical contacts.

Button cell batteries, and other batteries constructed along similar lines, may further take advantage of the metallic housing to create relatively tight friction contacts between the housing segments. The housing segments may be positioned with respect to one another and then struck to create a friction fit between the two housing segments. Such friction fits have traditionally provided effective sealing against environmental interaction. Because of the general effectiveness of such metallic housings, non-metallic housings have not typically been utilized.

But button cell batteries and similar batteries have certain limitations. In particular, because the process of striking the housing segments together relies on radial force between the inner and outer housing segments, button cell batteries are, by definition, substantially circular so as to provide radial force for the friction fit. Consequently, button cell batteries are not easily shape-adaptable. In addition, the metallic housing may be susceptible to electromagnetic environments. In particular, strong magnetic fields, such as those found in magnetic resonance imaging, or MRI systems, may interfere with the button cell battery or experience interference from the button cell battery. Consequently, medical device applications, and particularly implantable medical device applications, may not be able to conveniently utilize button cell batteries.

SUMMARY

Historically, these challenges have been addressed in part though welding housing segments together. In particular, non-circular enclosures for electrochemical modules have been created by laser welding the housing segments together. In so doing, the need for radial force to hold the housing segments together is reduced or eliminated altogether. However, welded embodiments may nevertheless remain susceptible to electromagnetic environments as well as being relatively expensive to manufacture.

An enclosure for an electrochemical module has been developed which utilizes a housing made from insulative materials. Materials such as polymers may be formed into housing segments. The housing segments may be engaged and secured with respect to one another with a crimp ring. This stands in contrast to metallic housing segments, which may either be secured via radial crimping or welding, as described above. A grommet may contribute to sealing the enclosure. While the crimp ring, in particular, may be metallic, the crimp ring may tend to be much smaller than the housing segments. Consequently, the enclosure as a whole may be less susceptible to or less likely to disrupt electromagnetic environments.

The particular details of how the housing segments are secured together aside, certain past investigations into the practicality of utilizing nonmagnetic housing materials have concluded that doing so would be impractical. In the past, manufacturing and molding of such materials, and particularly those of non-uniform shape, may produce weaknesses in the material which may be unsuitable for a substantially sealed electrochemical module enclosure. More recent assessments of new materials has surprisingly produced results which suggest that modern polymers may be suitable to electrochemical enclosure applications of non-uniform shape.

In an embodiment, an electrochemical device comprises an electrochemical module and an enclosure configured to enclose the electrochemical module. The enclosure comprises a first housing portion forming a first rim and a second housing portion forming a second rim, the first housing portion and the second housing portion at least partially forming, when the first rim substantially abuts the second rim, a volume configured to enclose the electrochemical device. At least one of the first housing portion and the second housing portion being formed of an insulative material. The enclosure further comprises a crimp ring engaging the first rim and the second rim, the crimp ring being configured to secure the first housing portion with respect to the second housing portion and a grommet positioned between and contacting the first rim and the second rim. The enclosure is substantially sealed.

In an embodiment, the electrochemical device further comprises a first feedthrough in the first housing portion and a second feedthrough in the second housing portion configured to contact and provide electrical connection to the electrochemical cell at first and second locations, respectively.

In an embodiment, the first feedthrough and the second feedthough are co-molded with the first housing portion and the second housing portion, respectively.

In an embodiment, the first housing portion and the second housing portion are irregularly shaped.

In an embodiment, the first housing portion and the second housing portion each have a major surface having an edge, wherein the edge comprises at least one linear portion.

In an embodiment, the edge further comprises at least one non-linear portion.

In an embodiment, the insulative material is a polymer.

In an embodiment, the insulative material has a breakdown voltage of at least approximately 18.9 kiloVolts per millimeter.

In an embodiment, the crimp ring is metallic.

In an embodiment, the crimp ring comprises a plurality of discontinuous segments.

In an embodiment, the crimp ring comprises opposing longitudinal edges, the first rim of the first housing portion and the second rim of the second housing portion each form an lip having a contact surface, the contact surface being configured to contact, at least in part, the grommet portion, and each of the lip of the first rim of the first housing portion and the lip of the second rim of the second housing portion is configured to admit a respective one of the longitudinal edges of the crimp ring.

In an embodiment, the crimp ring engages around a periphery of the first rim of the first housing portion and the second rim of the second housing portion.

In an embodiment, at least one of the grommet and the first rim and the second rim have texture configured to secure, at least in part, the grommet to the first rim and the second rim.

In an embodiment, the enclosure is substantially sealed with a leak rate of not more than approximately $1 \times 10^{-8}$ standard cubic centimeters of helium per second.

In an embodiment, a method of assembling an electrochemical device, comprises the steps of placing an electrochemical module into a first housing portion and having a first rim and a first feedthrough so that a first electrical terminal of the electrochemical module is in electrical contact with the first feedthrough, placing a second rim of a second housing portion in juxtaposition with the first rim of the housing portion, the second housing having a second feedthrough forming a volume enclosing the electrochemical module so that a second electrical terminal of the electrochemical module is in electrical contact with the second feedthrough, with at least one of the first housing portion and the second housing portion being comprised of an insulative material, positioning a grommet between and in contact with the first rim of the first housing portion and the second rim of the second housing portion, positioning a crimp ring proximate the first rim of the first housing portion and the second rim of the second housing portion, and crimping the crimp ring to engage with the first rim of the first housing portion and the second rim of the second housing portion and to secure, at least in part, the first housing portion with respect to the second housing portion and substantially seal the volume enclosing the electrochemical module.

In an embodiment, the crimp ring comprises opposing longitudinal edges and the first rim of the first housing portion and the second rim of the second housing portion each form a lip having a contact surface, the contact surface being configured to contact, at least in part, the grommet portion. The crimping step admits a respective one of the longitudinal edges of the crimp ring into each of the lip of the first rim of the first housing portion and the lip of the second rim of the second housing portion.

In an embodiment, the crimping step engages the crimp ring around a periphery of the first rim of the first housing portion and the second rim of the second housing portion.

In an embodiment, the crimping step substantially seals the enclosure with a leak rate of not more than approximately $1 \times 10^{-8}$ standard cubic centimeters of helium per second.

FIGURES

DESCRIPTION

Figure 1:
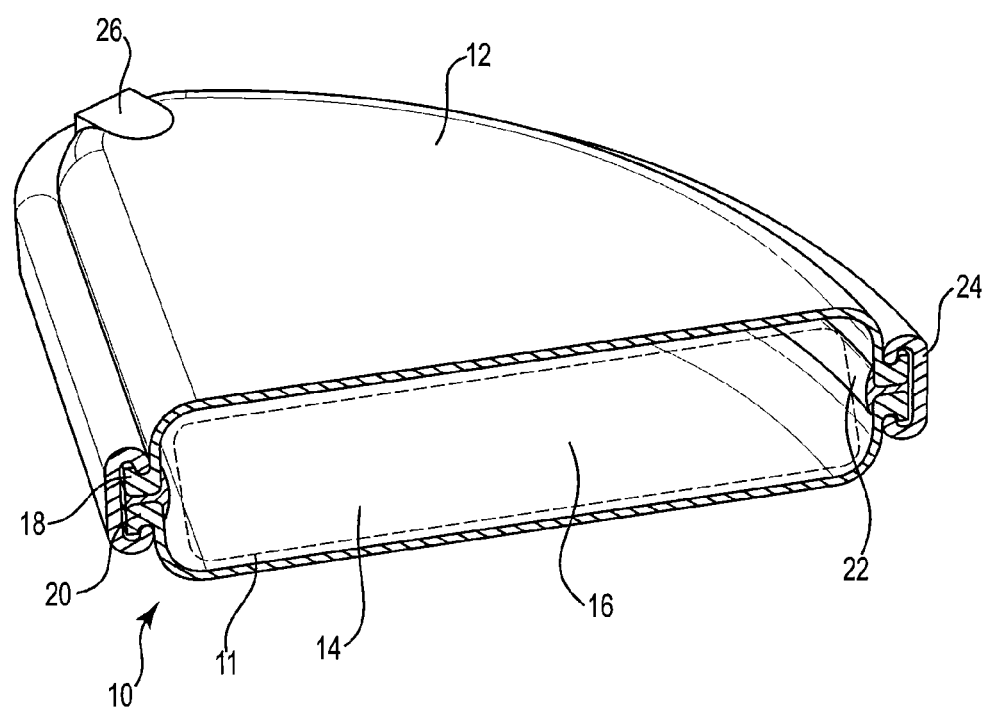
FIG. 1 is a cross-sectional perspective view of an enclosure for an electrochemical module.

FIG. 1 is a cross-sectional perspective view of an embodiment of an enclosure 10 for electrochemical module 11 (illustrated in outline to preserve interior view of enclosure 10), such as a battery or a capacitor. First housing portion 12 and second housing portion 14 generally form volume 16 configured to enclose electrochemical module 11. First housing portion 12 and second housing portion 14 form first rim 18 and second rim 20, respectively. Volume 16 may be formed when first rim 18 and second rim 20 substantially abut one another. Grommet 22 is positioned between first rim 18 and second rim 20 to provide, at least in part, sealing for volume 16. Crimp ring 24 is configured to engage with first rim 18 and second rim 20 to secure first housing portion 12 with respect to second housing portion 14. Feedthrough 26 is configured to pass an electrically conductive member through first housing portion 12 to be in electrical contact with electrochemical module 11 contained within volume 16.

In various embodiments, first housing portion 12 and second housing portion 14 are made of an insulative material configured to be substantially isolated against electromagnetic forces. In certain embodiments, first housing portion 12 and second housing portion 14 are formed of a non-magnetic or a paramagnetic material. In an embodiment, first housing portion 12 and second housing portion 14 are formed from a polymer such as a polyether ether ketone ("PEEK") polymer. In various embodiments, the insulative material of first housing portion 12 and second housing portion 14 has a breakdown voltage of at least approximately 18.9 kiloVolts per millimeter. Such materials of the various embodiments of enclosure 10 may be selected to reduce or minimize reaction in high intensity electromagnetic fields, such as those inducted by MRI machines. Such materials may, in certain embodiments, be either substantially or totally unaffected by an MRI field nor affect an MRI field.

In various embodiments, grommet 22 is selectable from various substantially impermeable materials. Such materials include, but are not limited to, polyether ether ketone ("PEEK") polymer, polyphenylene sulfide ("PPS") polymer, polypropylene ("PP"), hydrogenated nitrile rubber ("HNBR", also known in the art as "highly saturated nitrile" rubber or "HSN") and a flouroelastomer. In various embodiments, grommet 22 is made from a relatively soft and deformable material, such as HNBR and a flourelastomer. While relatively hard materials may be utilized, relatively low durometer materials may advantageously provide improved resistance to gas and fluid flow into volume 16 in comparison with relatively hard materials when first housing portion 12 and second housing portion 14 are secured with respect to one another by crimp ring 24.

In an embodiment, grommet 22, in combination with first housing portion 12, second housing portion 14 and crimp ring 24, provides a hermetic seal for volume 16. In alternative embodiments, grommet 22 substantially hermetically seals volume 16. In an embodiment, volume 16 has a leak rate of not more than approximately $1 \times 10^{-8}$ standard cubic centimeters of helium per second. In an embodiment which is configured to meet precise standards, volume 16 has a leak rate of not more than exactly $1 \times 10^{-8}$ standard cubic centimeters of helium per second.

Crimp ring 24 is configured to exert a compressive or crimp force on first rim 18 and second rim 20 to secure first housing portion 12 with respect to second housing portion 14. In various embodiments, crimp ring 24 is metallic, in certain embodiments stainless steel, and in an embodiment 400-Series stainless steel. Alternative materials, metallic or otherwise, which can provide the compressive force on first rim 18 and second rim 20 which may secure first housing portion 12 with respect to second housing portion 14 and provide an appropriate leak rate as described above may be utilized.

In various embodiments, feedthrough 26 is independently fabricated from first housing segment 12 and then attached with respect to first housing segment 12 during manufacturing. Attachment may be based on insertion, a press fit or a rivet or similar structure. In alternative embodiments, feedthrough 26 is co-molded with first housing segment 12.

Figure 2:
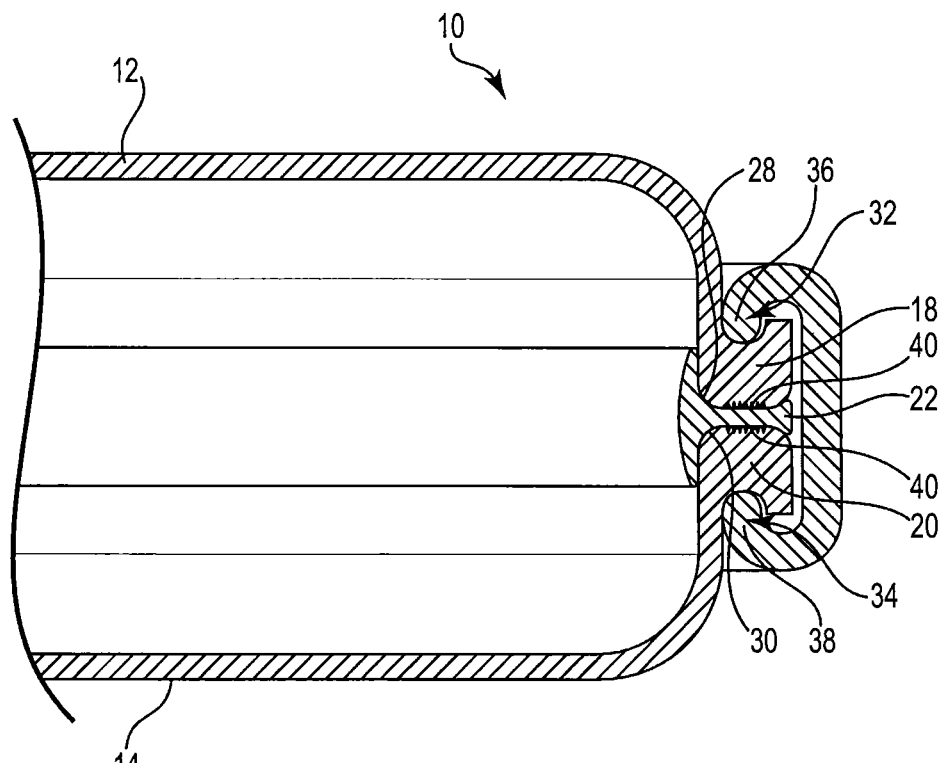
FIG. 2 is a cross-sectional view of the enclosure of FIG. 1.

FIG. 2 is a cross-sectional view of enclosure 10. First rim 18 and second rim 20 are configured with curled edges to create contact surfaces 28 and 30, respectively, to interface with grommet 22, and channels 32 and 34, respectively, to seat and engage with opposing edges 36, 38 of crimp ring 24. In various embodiments, first rim 18 and second rim 20 are from approximately one (1) millimeter to approximately three (3) millimeters wide.

Figure 3:
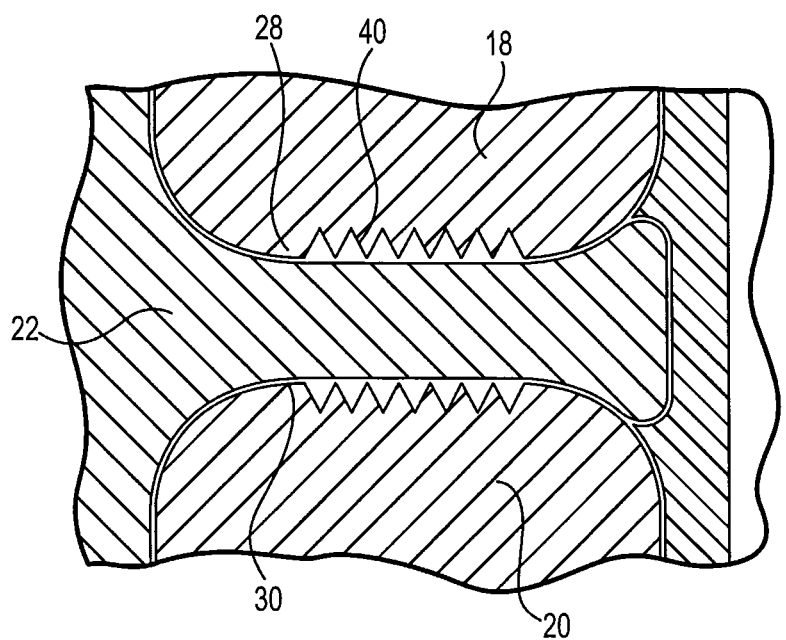
FIG. 3 is an enhanced view of a grommet and housing of the enclosure of FIG. 1.

FIG. 3 is an enhanced cross-sectional view of first rim 18, second rim 20 and grommet 22. In particular, FIG. 3 illustrates an embodiment in which contact surfaces 28 and 30 are roughened to improve engagement with grommet 22 in comparison with a smooth surface. As illustrated, contact surfaces 28, 30 have grooves 40. Alternatively, contact surfaces 28, 30 may be sharpened or otherwise force concentrated so as to improve engagement with and deformation of grommet 22.

In further embodiments, grommet 22 may incorporate grooves or other force concentrators to promote engagement with contact surfaces 28, 30. Such force concentration may be instead of or in supplement to similar construction on contact surfaces 28, 30. In an embodiment, grommet 22 incorporates one or more triangular projections configured to engage with contact surfaces 28, 30. The triangular projections may be configured to interface with individual grooves 40. Alternatively, a single large triangular projection of grommet 22 corresponding to each contact surface 28, 30 may enhance a friction fit of grommet 22 with contact surfaces 28, 30 without respect to interfacing with individual grooves 40.

Figure 4:
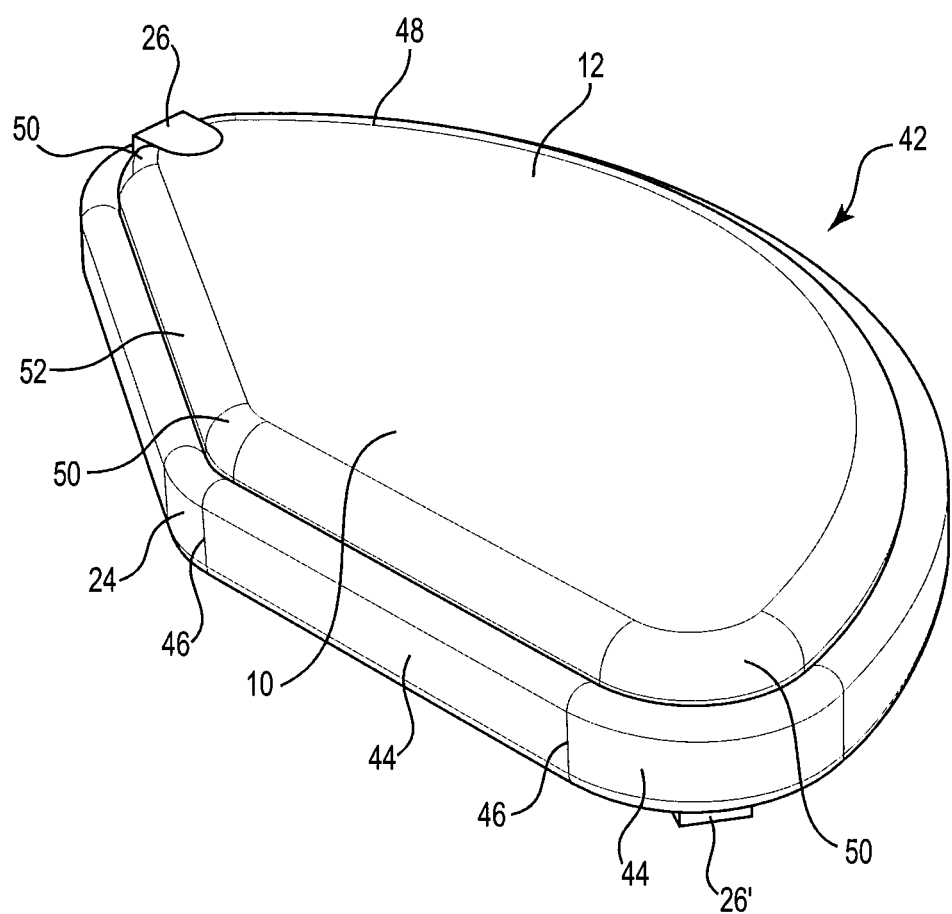
FIG. 4 is a perspective view of the enclosure of FIG. 1.

FIG. 4 is a perspective view of electrochemical device 42. In various embodiments, enclosure 10 is from approximately twenty-five (25) to approximately thirty-five (35) millimeters wide by approximately forty (40) millimeters to approximately sixty (60) millimeters long with a thickness from approximately four (4) millimeters to approximately nine (9) millimeters. In such embodiments, first housing portion 12, second housing portion 14 and crimp ring 24 have selectable dimensions based on the overall dimensions of enclosure 10.

In the illustrated embodiment, crimp ring 24 is comprised of multiple discontinuous crimp ring segments 44, each separated by a gap 46 or seam. In an embodiment, each gap 46 extends only partway through crimp ring 24, resulting in crimp ring 24 being a single piece with separately articulable segments 44. In an alternative embodiment, each gap 46 extends through crimp ring 24 producing crimp ring segments 44 being separately positioned with respect to the remainder of enclosure 10 and one another. Crimp ring 24 having multiple segments 44 may be relatively easier to manufacture and crimp in comparison with a crimp ring 24 not having multiple segments 44. However, crimp ring 24 having multiple crimp ring segments 44 may be relatively weaker than a crimp ring 24 made from only one piece. Under many circumstances, however, crimp ring 24 may nevertheless provide adequate compressive force to secure first housing portion 12 with respect to second housing portion 14 while incorporating multiple crimp ring segments 44.

Feedthroughs 26 and 26' are configured to pass an electrically conductive member through first housing portion 12 and second housing portion 14, respectively, to be in electrical contact with an electrochemical module contained within volume 16 (obscured). Feedthroughs 26, 26' may be utilized because, unlike conventional button cell batteries, for instance, first housing portion 12 and second housing portion 14 are insulative, as described above. Consequently, feedthrough 26 may provide electrical coupling to an anode of electrochemical module 11 while feedthrough 26' may provide electrical coupling to a cathode of electrochemical module 11, or vice versa.

First housing portion 12 and second housing portion 14, and by extension enclosure 10 and electrochemical device 42 in general, are configured to be irregularly shaped. As shown, enclosure 10 has curved segment 48, relatively sharper curved corners 50 and straight segments 52. Such non-circular molding stands in contrast to conventional button cell batteries and related articles, which conventionally have regular, usually circular shapes.

Figure 5:
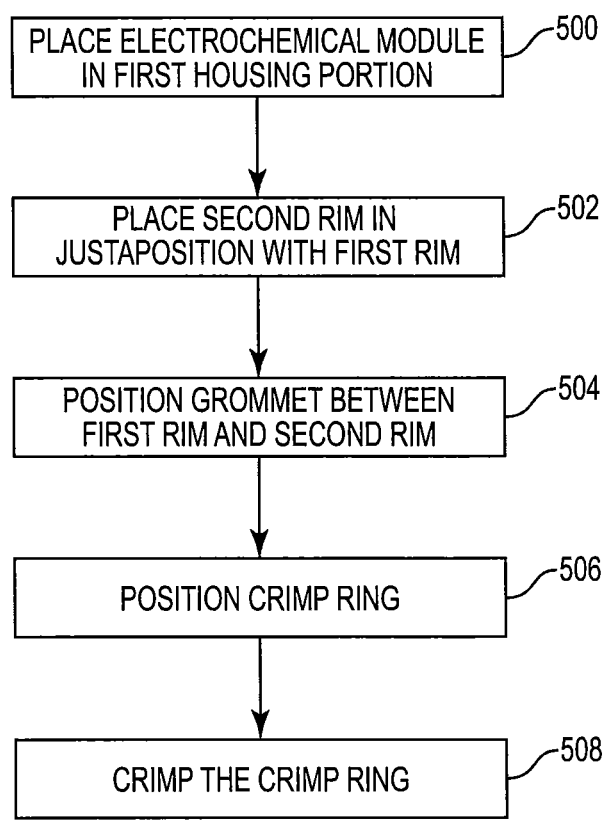
FIG. 5 is a flowchart for making an enclosure for an electrochemical module.

FIG. 5 is a flowchart for assembling electrochemical device 42. Electrochemical module 11 is placed (500) in first housing portion 12 so that first feedthrough 26 is in electrical contact with electrochemical module 11. Second rim 20 of second housing portion 14 is placed (502) in juxtaposition with first rim 18 of first housing portion 12 forming volume 16 enclosing electrochemical module 11 and placing second feedthrough 26' in electrical contact with electrochemical module 11. Grommet 22 is positioned (504) between and in contact with first rim 18 and second rim 20. Crimp ring 24 is positioned (506) proximate first rim 18 and second rim 20. Crimp ring 24 is crimped (508) to engage with first rim 18 and second rim 20 to secure, at least in part, first housing portion 12 with respect to second housing portion 14 to substantially seal volume 16 and electrochemical module 11.

Figure 6:
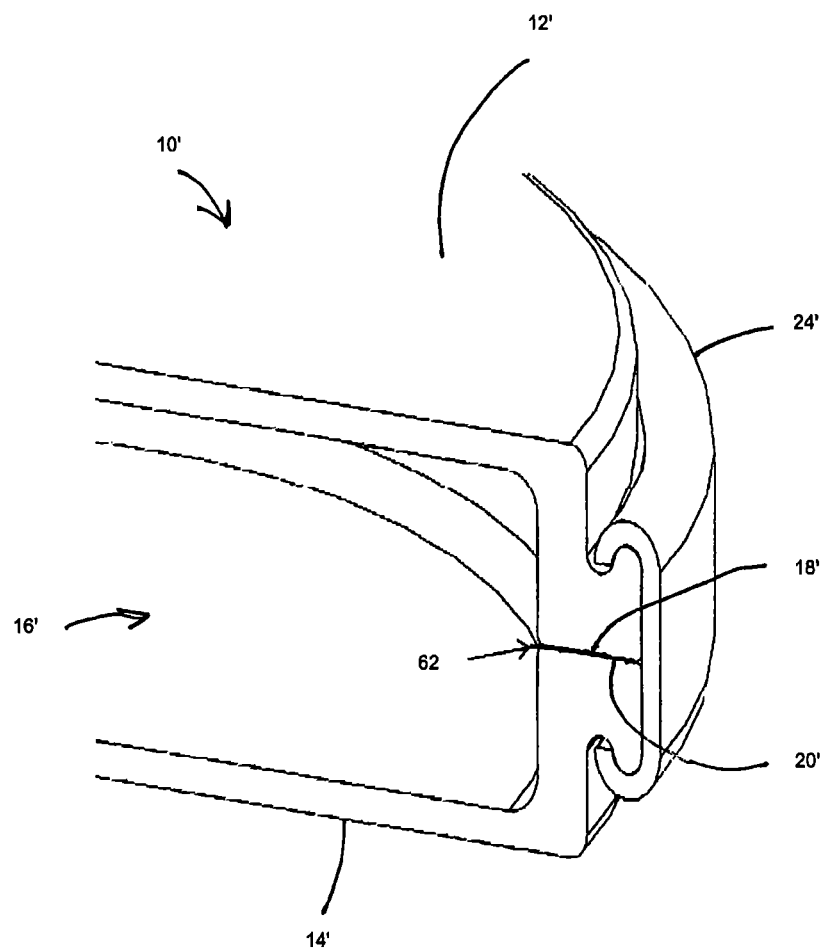
FIG. 6 is a partial cross-sectional view of an alternative embodiment of the enclosure.

FIG. 6 is a partial cross-sectional view of an alternative embodiment illustrated as enclosure 10'. Enclosure 10' is formed from first housing portion 12' and second housing portion 14' forming volume 16'. Similar to enclosure 10, enclosure 10' is closed and sealed with crimp ring 24' at first rim 18' of first housing portion 12' and second rim 20' of second housing portion 20'. Notably, enclosure 10' differs from enclosure 10 by the omission of grommet (22 and 26). In an embodiment, first rim 18' of first housing portion 12' directly mates with second rim 20' of second housing portion 20'. In this embodiment, first rim 18' and second rim 20 provide a seal for enclosure 10'. In an embodiment, first rim 18' of first housing portion 12' mates with second rim 20' of second housing portion 20' sealed with sealer 62 which assists with first rim 18' sealing with second rim 20'.

In the embodiment illustrated, first rim 18' and second rim 20' are generally flat providing a sealable mating surface. It is to be recognized and understood, however, that the mating surface formed by first rim 18' and second rim 20' may take other forms and equally, or potentially better, sealable. For example, it is contemplated first rim 18' and second rim 20' could form a complementary mating cross-section, such as an interlock formed with a "V" cross-sectional shape and a complementary "V-groove" cross-sectional shape in first rim 18' and second rim 20', respectively. It is also contemplated that a sealing surface could be formed with other cross-sectional shapes such as a round into a groove. Such non-flat mating surfaces may actually provide a better seal than the flat cross-sectional surfaces of first rim 18' and second rim 20' illustrated.

In an embodiment, sealing material 62, such as a silicone sealant, could be added between mating rims in all embodiments. For example, sealing material 62 may be used between first rim 18' and second rim 20' in enclosure 10'. It is also recognized that sealing material 62 could be used with first rim 18 and second rim 20 of enclosure 10.

Figure 7:
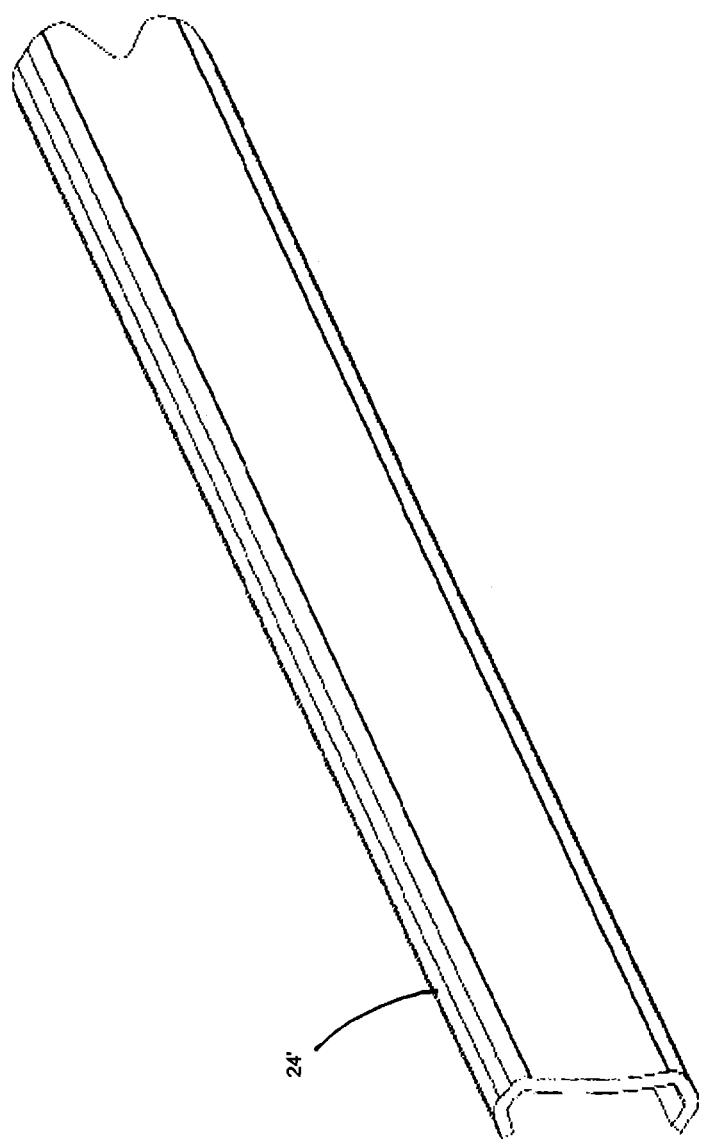
FIG. 7 illustrates an embodiment of a crimp ring for use with the enclosure.

In an embodiment, first housing portion 12 and second housing portion 14 are formed of a non-conductive polymer. FIG. 7 illustrates an embodiment of crimp ring 24', configured to engage with first rim 18 and second rim 20 to secure first housing portion 12 with respect to second housing portion 14, is comprised of a relatively resilient metal, in various embodiments a metal more resilient than first housing portion 12 and second housing portion 14. In an embodiment, crimp ring 24' is comprised of 400-series stainless steel. Alternatively, crimp ring 24' may be made of any material which meets the requirements for strength and resiliency described herein. While in certain embodiments, crimp ring 24' is not electrically conductive, in various embodiments, crimp ring 24' is made of a conductive material. In various embodiments, crimp ring 24' has a resistivity of less than approximately 0.00006 ohm-centimeters. Because crimp ring 24' is relatively strong and resilient, crimp ring 24' may be struck to engage first rim 18 and second rim 20 to secure first housing portion 12 with respect to second housing portion 14. Crimp ring 24' may be formed as a continuous strip which may be formed around the outside edges of first housing portion 12 and second housing portion 14 or may be cut to length.

Figure 8:
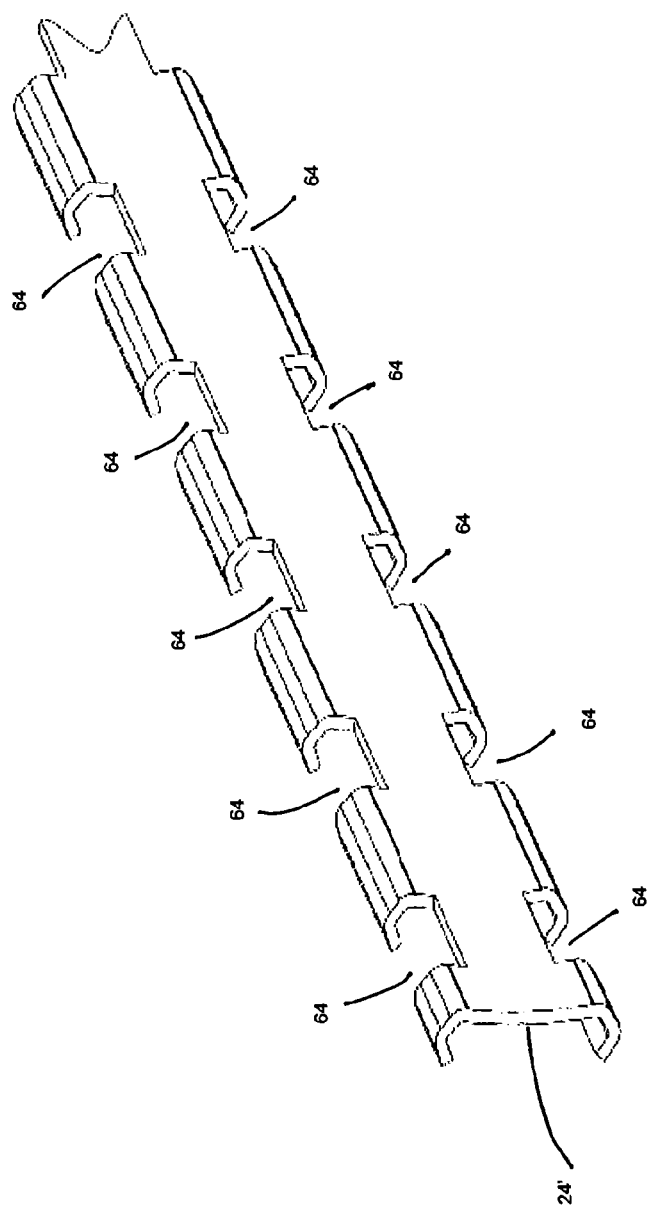
FIG. 8 illustrates an alternative embodiment of the crimp ring.
Figure 9:
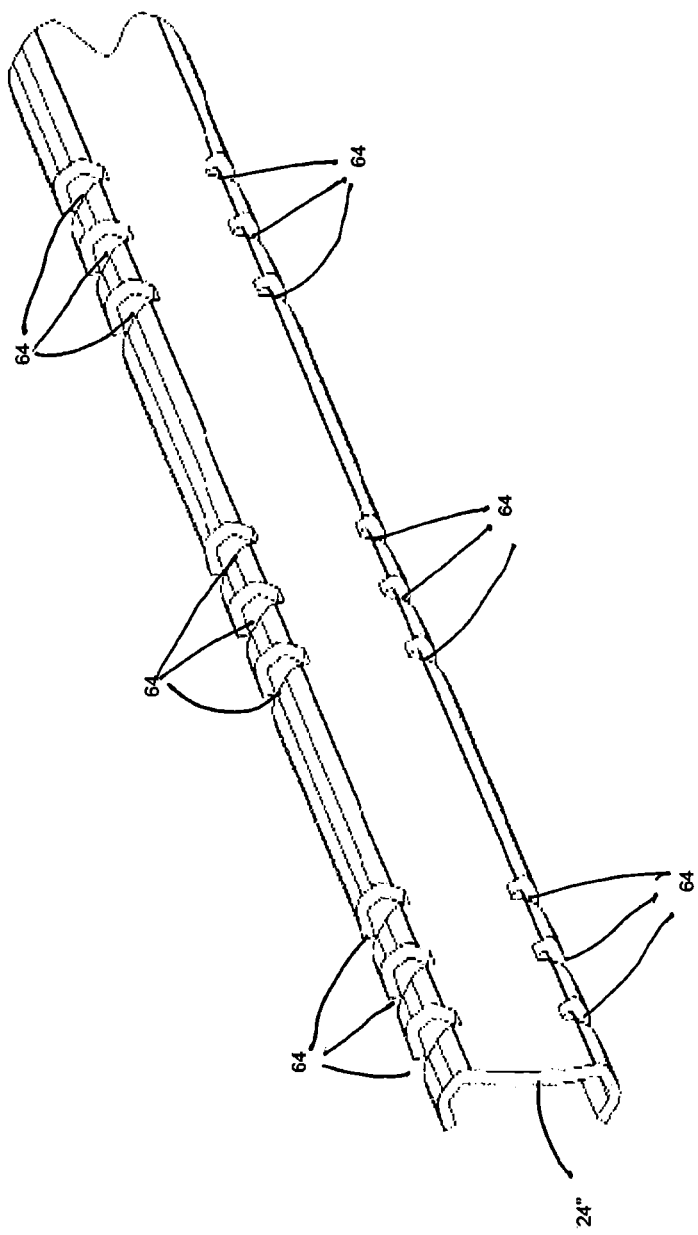
FIG. 9 illustrates another alternative embodiment of the crimp ring.
Figure 10:
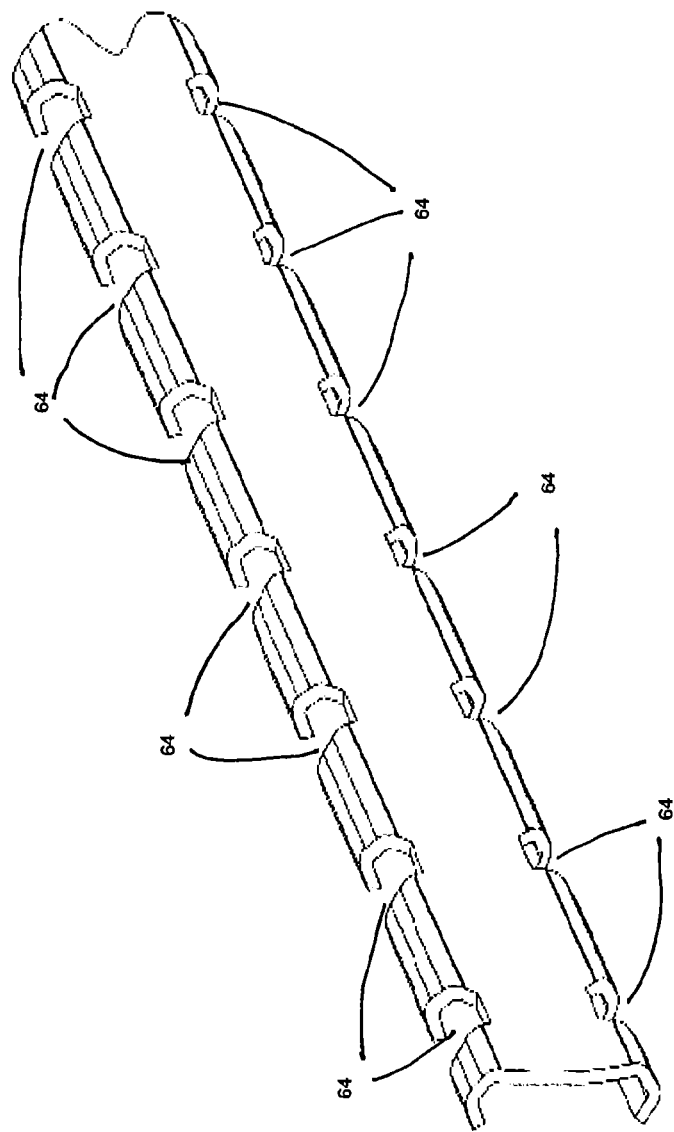
FIG. 10 illustrates a still further alternative embodiment of the crimp ring.
Figure 11:
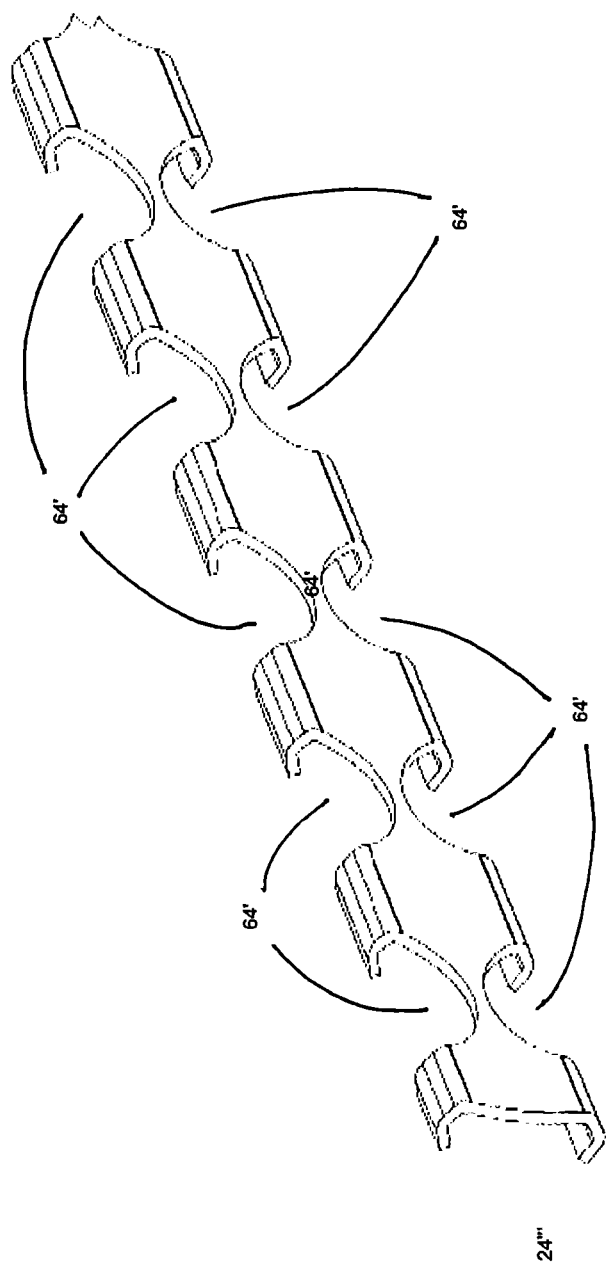
FIG. 11 illustrates still yet another alternative embodiment of the crimp ring.

FIG. 8 illustrates an alternative embodiment of crimp ring 24, 24'. Crimp ring 24" is still continuous in the strip. However, crimp ring 24" contains a series of notches, or cut-out portions, 64 which allow crimp ring 24" to be more easily formed around an exterior form of first housing portion 12 and second portion 14, especially when the exterior form of first housing portion 12 and second housing portion 14 around which crimp ring 24" is to be utilized is not linear but rather may have a non-linear, or perhaps, arcuate shape. In the embodiment illustrated in FIG. 8, crimp ring 24" has corresponding notches 64 on each side of crimp ring 24". Although shown in FIG. 8 as notches 64 being approximately equally longitudinally spaced along crimp ring 24", it is also contemplated that notches 64 may be unequally longitudinally spaced, or that notches 64 may be of uneven width, so as to accommodate a differing arcuate shape of exterior of first housing portion 12 and second housing portion 14. If, for example, first housing portion 12 and second housing portion 14 have a greater radius of curvature, it may be desirable for some notches 64 to be closer together longitudinally, as illustrated in FIG. 9, or to have a greater number of notches 64 in an equal longitudinal distance along crimp ring 24", as illustrated in FIG. 10. In an embodiment illustrated in FIG. 11, crimp ring 24''' has notches 64' which are formed from a different cross-section than notches 64 of FIG. 8. In particular, notches 64 of FIG. 8 have a roughly rectangular cross-section with sharp corners. In contrast, notches 64' of FIG. 11 have a cross-section, all or a portion of which, is arcuate rather than linear. That is, notches 64' in FIG. 11 form a circular or oval pattern in crimp ring 24". It is to be recognized and understood that the combination of strips, lengths of segments of crimp ring 24', 24", 24''' is virtually endless as are the contours of notches 64, 64' so as to facilitate the rounding of corners of enclosures 10, 10' and like areas of constraint.

Thus, embodiments of the stable memory source bias over temperature and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An electrochemical device, comprising:
    an electrochemical module; and
    an enclosure configured to enclose said electrochemical module, comprising:
        a first housing portion forming a first rim;
        a second housing portion forming a second rim, said first housing portion and said second housing portion at least partially forming, when said first rim substantially abuts said second rim, a volume configured to enclose said electrochemical device;
        at least one of said first housing portion and said second housing portion being comprised of an insulative material;
        a crimp ring engaging said first rim and said second rim, said crimp ring being configured to secure said first housing portion with respect to said second housing portion; and
        a grommet positioned between and contacting said first rim and said second rim;
        wherein said enclosure is substantially sealed.

2. The electrochemical device of claim 1, further comprising a first feedthrough in said first housing portion and a second feedthrough in second housing portion configured to contact and provide electrical connection to said electrochemical cell at first and second locations, respectively.

3. The electrochemical device of claim 2 wherein said first feedthrough and said second feedthough are co-molded with said first housing portion and said second housing portion, respectively.

4. The electrochemical device of claim 1 wherein said first housing portion and said second housing portion are irregularly shaped.

5. The electrochemical device of claim 4 wherein said first housing portion and said second housing portion each have a major surface having an edge, wherein said edge comprises at least one linear portion.

6. The electrochemical device of claim 5 wherein said edge further comprises at least one non-linear portion.

7. The electrochemical device of claim 1 wherein said insulative material is a polymer.

8. The electrochemical device of claim 1 wherein said insulative material has a breakdown voltage of at least approximately 18.9 kiloVolts per millimeter.

9. The electrochemical device of claim 1 wherein said crimp ring is metallic.

10. The electrochemical device of claim 9 wherein said crimp ring is metal.

11. The electrochemical device of claim 1 wherein said crimp ring comprises a plurality of discontinuous segments.

12. The electrochemical device of claim 1:
    wherein said crimp ring comprises opposing longitudinal edges;
    wherein said first rim of said first housing portion and said second rim of said second housing portion each form a lip having a contact surface, said contact surface being configured to contact, at least in part, said grommet portion; and wherein each of said lip of said first rim of said first housing portion and said lip of said second rim of said second housing portion is configured to admit a respective one of said longitudinal edges of said crimp ring.

13. The electrochemical device of claim 1 wherein said crimp ring engages around a periphery of said first rim of said first housing portion and said second rim of said second housing portion.

14. The electrochemical device of claim 1 wherein at least one of said grommet and said first rim and said second rim have texture configured to secure, at least in part, said grommet to said first rim and said second rim.

15. The electrochemical device of claim 1 wherein said enclosure is substantially sealed with a leak rate of not greater than approximately $1 \times 10^{-8}$ standard cubic centimeters of helium per second.

16. A method of assembling an electrochemical device, comprising the steps of:
placing an electrochemical module into a first housing portion having a first rim and a first feedthrough so that a first electrical terminal of said electrochemical module is in electrical contact with said first feedthrough;
placing a second rim of a second housing portion in juxtaposition with said first rim of said housing portion, said second housing having a second feedthrough forming a volume enclosing said electrochemical module so that a second electrical terminal of said electrochemical module is in electrical contact with said second feedthrough, at least one of said first housing portion and said second housing portion being formed of an insulative material;
positioning a grommet between and in contact with said first rim of said first housing portion and said second rim of said second housing portion;
positioning a crimp ring proximate said first rim of said first housing portion and said second rim of said second housing portion; and
crimping said crimp ring to engage with said first rim of said first housing portion and said second rim of said second housing portion and to secure, at least in part, said first housing portion with respect to said second housing portion and substantially seal said volume enclosing said electrochemical module.

17. The method of claim 16 wherein said first feedthrough and said second feedthough are co-molded with said first housing portion and said second housing portion, respectively.

18. The method of claim 16 wherein said first housing portion and said second housing portion are irregularly shaped.

19. The electrochemical device of claim 18 wherein said first housing portion and said second housing portion each have a major surface having an edge, wherein said edge comprises at least one linear portion.

20. The method of claim 19 wherein said edge further comprises at least one non-linear portion.

21. The method of claim 16 wherein said insulative material is a polymer.

22. The method of claim 16 wherein said crimp ring is metal.

23. The method of claim 16 wherein said crimp ring comprises a plurality of discontinuous segments.

24. The method of claim 16:
wherein said crimp ring comprises substantially opposing longitudinal edges;
wherein said first rim of said first housing portion and said second rim of said second housing portion each form a lip having a contact surface, said contact surface being configured to contact, at least in part, said grommet portion; and
wherein said crimping step admits a respective one of said longitudinal edges of said crimp ring into each of said lip of said first rim of said first housing portion and said lip of said second rim of said second housing portion.

25. The method of claim 16 wherein crimping step engages said crimp ring around a periphery of said first rim of said first housing portion and said second rim of said second housing portion.

26. The method of claim 16 wherein at least one of said grommet and said first rim and said second rim have texture configured to secure, at least in part, said grommet to said first rim and said second rim.

27. The method of claim 16 wherein crimping step substantially seals said enclosure with a leak rate of not greater than approximately $1 \times 10^{-8}$ standard cubic centimeters of helium per second.

28. The method of claim 16 wherein said insulative material has a breakdown voltage of at least approximately 18.9 kiloVolts per millimeter.

* * * * *